(12) United States Patent
Divisek et al.

(10) Patent No.: US 6,277,261 B1
(45) Date of Patent: Aug. 21, 2001

(54) METHOD OF PRODUCING ELECTROLYTE UNITS BY ELECTROLYTIC DEPOSITION OF A CATALYST

(75) Inventors: Jiri Divisek, Jülich; Hans-Friedrich Oetjen, Linnich; Volkmar M. Schmidt, Viernheim, all of (DE)

(73) Assignee: Forschungszentrum Jülich GmbH, Jülich (DE)

( * ) Notice: Subject to any disclaimer, the term of this patent is extended or adjusted under 35 U.S.C. 154(b) by 0 days.

(21) Appl. No.: 09/435,842

(22) Filed: Nov. 8, 1999

Related U.S. Application Data

(63) Continuation-in-part of application No. PCT/DE98/01302, filed on May 9, 1998.

(51) Int. Cl.[7] .................................................. C25D 5/02
(52) U.S. Cl. .......................... 205/114; 427/115; 429/41; 29/623.5
(58) Field of Search .......................... 205/114; 204/284; 427/115; 429/41, 42, 43; 29/623.5

(56) References Cited

U.S. PATENT DOCUMENTS

| 4,326,930 | * | 4/1982 | Nagel et al. | 205/50 |
| 5,492,543 | * | 2/1996 | Lim | 29/623.1 |

FOREIGN PATENT DOCUMENTS 28 21 271   10/1979 (DE).

* cited by examiner

*Primary Examiner*—Kathryn Gorgos
*Assistant Examiner*—Wesley A. Nicolas
(74) *Attorney, Agent, or Firm*—Klaus J. Bach

(57) ABSTRACT

In a method for the manufacture of an electrode-electrolyte unit with a catalytically active layer a metal salt solution is placed layer-like between an electrolyte layer and an electrolyte and the metal in the metal salt solution is precipitated from the metal salt in situ between the two layers.

5 Claims, 1 Drawing Sheet

12 ## METHOD OF PRODUCING ELECTROLYTE UNITS BY ELECTROLYTIC DEPOSITION OF A CATALYST

This is a continuation-in-part application of pending international application PCT/DE98/01302 filed May 9, 1998 and claims the priority of German application 197 20 688.3 filed May 16,1997.

BACKGROUND OF THE INVENTION

The invention relates to a method of producing an electrode-electrolyte unit with a catalytically active layer.

Electrochemically operating units consisting of electrode-electrolyte -electrode are provided for example for use in fuel cells, electrolysis cells, or cells for electro-organic syntheses. The electrodes are preferably porous throughout so that operating means such as air and hydrogen can pass through the electrodes. In many cases, the electrodes participating in the electrochemical reactions must be activated by suitable catalysts.

For fuel cells whose operating temperatures are 0°–150° C., ion conductive solid electrolyte membranes are used. The anodes for the hydrogen oxidation and the cathodes for the oxygen reduction are coated mostly with platinum, recently also with a platinum-ruthenium alloy. The principle of such a membrane fuel cell is known from the patent publication "K. Kordesch, Günther Sinadar: "FUEL CELLS AND THEIR APPLICATIONS", VCH Weinheim, 1996. In this publication furthermore various methods for producing membrane-electrode units for fuel cells are described. For example, the electrode can be activated by sputtering a thin platinum layer onto the diffusion layer of the gas diffusion electrode. Additional manufacturing methods are described in the German patent application with the official serial number 196 38 928.3-45. The manufacture of gas diffusion electrodes by way of a spray process is disclosed in the printed publication EP 0 687 024 A1.

The main disadvantages of the known electrode-electrolyte units with electrochemically active areas are the high costs. The high price results essentially from expensive membranes consisting for example of NAFION (a product of E.I. Dupont De Nemours) and from expensive catalysts consisting for example of platinum.

To avoid the high prices, it is being tried therefore to deposit thin catalytically active layers in electrochemically active areas. The electrochemical processes in a fuel cell occur immediately at the contact area between the gas diffusion electrode and the NAFION (a product of E.I. Dupont De Nemours) membrane. The catalyst is therefore preferably located at these contact areas, in other words, at the three-phase zone consisting of a gas distributor with electronic current conductance, the place of the electrochemical reaction and the electrolytes (in this case: NAFION (a product of E.I. Dupont De Nemours) membrane).

The printed publication U.S. Pat. No. 5,084,144 and the printed publication, E. J. Taylor, E. B. Anderson, NR K. Vilambi, Journal of the Electrochemical Society, Vol. 139 (1992) L 45–46" discloses a method for the manufacture of gas diffusion electrodes with the object to achieve a high platinum utilization for membrane fuel cells. In accordance with that method, among others, a catalyst metal is electrolytically deposited from a galvanic bath to form a thin catalytically active layer.

The disadvantage of the method disclosed in U.S. Pat. No. 5 084 144, is that it requires expensive liquid galvanic baths which must be reconditioned in a complicated and expensive manner. Furthermore, the utilization of the precious metal dissolved in the galvanic bath is very limited so that the advantages obtained by the optimized deposition are offset for example by rinsing procedures.

It is the object of the present invention to provide a cost effective manufacturing method for an electrode-electrolyte unit.

SUMMARY OF THE INVENTION

In a method for the manufacture of an electrode-electrolyte unit with a catalytically active layer a metal salt solution is placed layer-like between an electrolyte layer and an electrolyte and the metal in the metal salt solution is precipitated from the metal salt in situ between the two layers.

With the method according to the invention dissolved metal salt is first sandwiched between an electrolyte and an electrode. In this way, the dissolved metal salt forms an intermediate layer in a multi-layer system. Subsequently, the metal is electrochemically removed from the intermediate layer that is from the dissolved metal salt.

Salts of a metal of the VIII group or of an I-B metal of the periodic system may be provided as metal salts from which catalytically active metal can be extracted.

If, for example, platinum is to be deposited as the catalytically active metal, a suitable salt is for example $H_2PtCl_6$ or $Pt(NH_3)_4Cl_2$. Such a salt is then mixed with a solvent.

As solvents, for example, acids such as HCl, $H_2SO_4$, $HClO_4$ are suitable.

First, the metal salt solution may be applied as a layer on the electrolyte layer of the electrode by spraying, brush coating, screen printing, etc . . . . Then the electrode, or respectively, the electrolyte layer is disposed onto the solution layer. In this way, a layer system is provided which consists of an electrode, a metal salt solution and an electrolyte.

The layer thickness that is the amount of metal salt deposited between the electrolyte and the electrode is for example so selected that up to 0.01–1 mg metal per $cm^2$ can be deposited from the intermediate layer. In order to generate the electric current required for the deposition, for example, a second electrode which is also disposed adjacent the electrolyte layer may be provided as an additional current conductor. The electrolyte layer is then disposed between two electrodes.

In the method according to the invention, no liquid electrolyte is needed for the electrochemical deposition. Consequently, expensive liquid galvanic baths are eliminated. The complicated and expensive reconditioning and decontamination of such galvanic baths is also eliminated. Only a thin layer of the solution is applied. The consumption of expensive metals such as platinum, ruthenium, rhodium or palladium is consequently minimized.

The catalytically active metal is deposited directly at the three-phase zone. The catalyst material is therefore applied to the electrochemically active area related to the predetermined utilization in a controlled manner.

As a result, the membrane with the catalyst deposited thereon can be manufactured comparatively inexpensively.

If electrodes together with the intermediate layer consisting of the metal salt solution are disposed at both sides of the electrolyte layer, this electrode-electrolyte compound structure can be used directly in a fuel cell.

For the manufacture of an alloy, in an advantageous embodiment of the method, the solution includes several metal salts, which are electrochemically deposited together. In this way, an alloy of two or more metals or mixtures of metals and metal oxides, that is, an alloy catalyst, is deposited. In particular, ruthenium and platinum containing salts are considered.

With respect to the known state of the art, this embodiment of the method according to the invention has the advantage that alloy catalysts can be optimally deposited and produced at the same time.

In another advantageous embodiment of the invention, the solution contains an ion conductive polymer in a dissolved or liquid state.

After completion of the process, an ion conductive polymer in the solution should be firmly connected to the membrane (electrolyte layer), that is it should be part of the membrane. A polymer suitable to achieve this object is to be selected. If for example, a solid electrolyte consisting of NAFION (a product of E.I. Dupont De Nemours) is used, preferably dissolved NAFION (a product of E.I. Dupont De Nemours) is used as ion conductive polymer in the solution.

The ion-conductive polymer causes an increase of the three-phase zone and, consequently improves the utilization of the catalyst material.

With the above-mentioned embodiment of the invention, catalytically active material is embedded in the solid material electrolyte and is advantageously mechanically firmly connected therewith.

The method facilitates the manufacture of an electrochemically active catalyst layer on a suitable carrier, which catalyst layer is suitable as a gas diffusion electrode for electrochemical applications such as in fuel cells, electrolysis cells, or cells for electro-organic syntheses. With the method electrodes with metal catalysts, alloys of metals or mixtures of metal oxides and metals can be manufactured in a simple manner. Only small amounts of the expensive catalyst material are consumed with this method.

With each embodiment, the method according to the invention facilitates the use of the accurate amount of metal salts. In this way, alloys or mixtures of metals and metal oxides of a predetermined combination can be accurately manufactured. An expert can determine optimal mixture ratios by simple test procedures.

With the electrochemical precipitation, the active layer is formed on the diffusion layer in a controlled manner at the three-phase zone between the gas space in the pores of the gas diffusion electrode, the electro-active catalyst and the electrolytes. As a result, the catalyst utilization in application such as in fuel cells, electrolysis cells or cells for electro-organic synthesis is optimized and the required total amount is significantly reduced.

A fuel cells stack can be provided with pre-finished electrodes at one side and electrodes prepared in accordance with the method of the invention mounted at the other side. The electrolytic precipitation can be performed in the finished assembled fuel cell unit.

For single uses, units consisting of an ion conductive solid electrolyte, a manufactured gas diffusion electrode as counter electrode and a prepared operating electrode may be bolted together with a suitable seal or cemented together or they may be encapsulated in a similar way. For the application, the active electrode layer is formed by a short electrolyte precipitation. Possible contamination or residues of the metal salt solution can subsequently be rinsed out.

Figure 1:
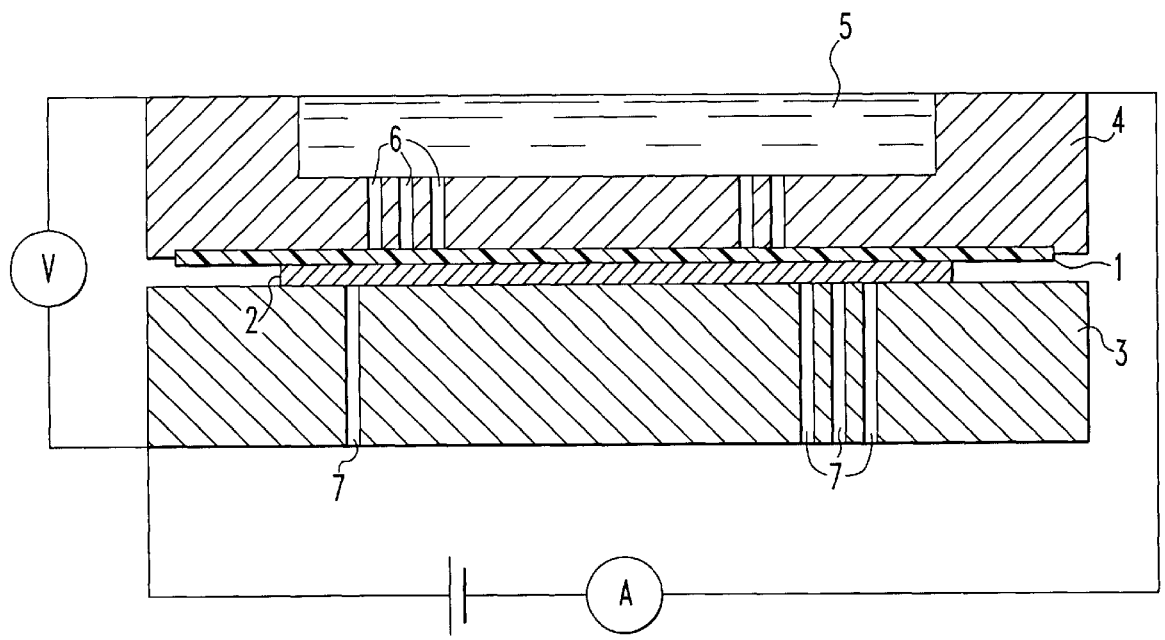
FIG. 1 shows an electrolyte limit according to the invention.

As shown in the schematic cross-sectional view of FIG. 1, an electrolyte layer 1 has a layer-like coating of a solution 2 disposed thereon. Electrodes 3 and 4 are disposed at opposite sides of the electrolyte layer 1. One of the electrodes 3 abuts the solution coating 2 and the other electrode 4 abuts the opposite side of the electrolyte layer 1. The electrode 4 includes a container-like recess 5. The container-like recess 5 is to be filled with water. Passages 6 present in the electrode 4 extend from the container-like recess 5 to the membrane 1. The membrane 1 is moistened by the water in the container-like recess 5. The moistened membrane remains electrically conductive. It is necessary that the membrane is electrically conductive in order to achieve the electrochemical precipitation of the metal from the solution. For the precipitation, a current is applied in the manner as shown in FIG. 1.

The gases generated during the electrochemical precipitation are discharged by way of the gas passages 7.

The container-like recess 5 may be provided with a closure element, which is not shown. In that case, water vapors can be generated in the container for keeping the membrane moist.

EXAMPLES

First Example

A diffusion layer for the technical gas diffusion electrode consisting of a mixture of finely distributed carbon and PTFE is manufactured. The diffusion layer contains no electro-mechanically active material:

A solution of a preferably 5% solution of NAFION (a product of E.I. Dupont De Nemours) in low-molecular alcohols, preferably 1-propanol or 2 propanol and an aqueous solution of hexachloroplatinum acid hydrate ($H_2PtCl_6$) is prepared. The concentrations in the mixture of NAFION (a product of E.I. Dupont De Nemours) solution and platinum solutions can be so adjusted that the desired impregnation with ion conductive NAFION (a product of E.I. Dupont De Nemours) and the catalyst coating for the technical gas-diffusion electrode are obtained (preferably, 0.01–1 mg catalyst/$c^2$ based on the geometric surface of the electrode). The mixture is then applied to the electrode by spraying brushing or screen-printing. As a counter electrode, a suitable electrode is provided or a counter electrode with an additional electrolyte layer is used. This stock unit is clamped together in an arrangement as shown in the figure. By applying a current density in the particular application of 0.1–10 mA/$cm^2$, for example 2 mA/$cm^2$, and a voltage of at least 1.23 V, for example, 2 V, the electrolysis is conducted at room temperature or at a raised temperature (<100° C.) until all the platinum is deposited on the porous electrically conductive layer. By the addition of $H_2O$ as indicated in the figure, it is insured that the polymer solid electrolyte does not dry out and consequently is, or respectively remains, ionically conductive. Subsequently, the electro-chemically active gas diffusion electrode so manufactured is treated for example with hydrogen peroxide, water and sulfuric acid and is cleaned.

Membrane electrode units with the manufactured electrochemically active gas diffusion electrodes are used particularly in PEM fuel cells, for example, with a platinum coating of about 0.1 mg/$cm^2$ for both the anode and the cathode. During operation with pure hydrogen and oxygen, current densities of more than 300 mA/$cm^2$ can be achieved at an operating temperature of 80° C. and with a terminal voltage of 0.7 V.

Second Example

The operation corresponds to that of the first example. Instead of a platinum salt solution however, a mixture of platinum and ruthenium salt solutions (for example: $H_2PtCl_6$ and $RuCl_3$ in $H_2SO_4$) is used. In this way, platinum-ruthenium alloys of a desired composition can be manufactured.

Third Example

The operation corresponds to that of the first example. The nafion and metal salt containing solution is applied directly to the solid electrolyte membrane by spraying brushing or screen-printing. Onto it a flexible graphite mesh or a graphite paper with suitable electronic conductivity and suitable porosity for establishing electric contact is placed. The subsequent steps are the same as in the first example.

What is claimed is:

1. A method for the manufacture of an electrode-electrolyte unit with a catalytically active layer, comprising the steps of placing a solution including a dissolved metal salt as a layer between an electrolyte layer and an electrode and precipitating metal electrochemically, in situ, from the metal salt on said electrode, whereby all of the metal salt is used in the precipitation of the metal from the metal salt for forming said catalytically active layer.

2. A method according to claim 1, wherein several metal salts are dissolved in said solution and are placed together between said electrolyte layer and said electrode and electrochemically precipitating said metal salts from the metal salts.

3. A method according to claim 1, wherein the solution with said metal salt includes an ion conductive polymer.

4. A method according to claim 2, wherein the solution with said metal salts includes an ion conductive polymer.

5. A method according to claim 1, wherein said electrode and said electrolyte layer have passages leading to said dissolved metal salt layer and moisture is admitted to said dissolved metal salt layer through the passages in said electrode and gas formed during precipitation is discharged through said passages formed in said electrolyte layer.

* * * * *